United States Patent [19]

Fonnesbeck

[11] Patent Number: 4,736,105
[45] Date of Patent: Apr. 5, 1988

[54] FLAME DETECTOR SYSTEM
[75] Inventor: Elmer M. Fonnesbeck, Orlando, Fla.
[73] Assignee: Tri-Star Research, Inc., Apopka, Fla.
[21] Appl. No.: 849,705
[22] Filed: Apr. 9, 1986
[51] Int. Cl.[4] .............................................. G01J 1/42
[52] U.S. Cl. ..................................... 250/372; 377/20; 307/518; 328/120
[58] Field of Search ................. 250/372; 340/578, 587; 377/20; 307/518; 328/119, 120

[56] References Cited

U.S. PATENT DOCUMENTS 4,005,754 2/1977 Linden et al. ......................... 340/578
4,280,184 7/1981 Weiner et al. ......................... 340/578

FOREIGN PATENT DOCUMENTS 2831466 2/1979 Fed. Rep. of Germany ...... 340/578

Primary Examiner—Janice A. Howell
Assistant Examiner—Richard Hanig
Attorney, Agent, or Firm—Macdonald J. Wiggins

[57] ABSTRACT

An ultraviolet type flame detection system utilizes an UV detector for producing pulses from flame produced UV photons. A logic and clock circuit defines a sequence of windows. A counter is advanced by the clock and reset if no detector pulse occurs in a window. If detector pulses occur in each of a preselected sequence of windows, the logic circuit enables an alarm. When detector pulses cease, the logic circuit resets the system.

11 Claims, 2 Drawing Sheets

FLAME DETECTOR SYSTEM

BACKGROUND OF THE INVENTION

1. Field of the Invention

The present invention relates to flame detectors, and more particularly to a flame detector resistant to false alarms.

2. Description of the Prior Art

It is well known to detect the presence of a flame due to the ultraviolet radiation which will occur sporadically from the flame. In the prior art, it is known to detect ultraviolet (UV) radiation by systems using gas discharge type electronic tubes. Typical of such systems is the flame detection system available from Detector Electronics Corporation which uses an ultraviolet sensor tube. Certain aspects of this system are disclosed in U.S. Pat. No. 3,952,196 to Larson.

One of the principal problems with known ultraviolet flame detecting systems is that of false alarms. There will normally be background strikes of ultraviolet energy or other radiation which may trigger a gas discharge type detector tube. Flames will produce groups of short bursts of ultraviolet radiation and most systems will not discriminate between such bursts and background counts, particularly if such systems are set to a sensitive threshold.

This problem is particularly acute in systems using hydrogen or other gases which burn with an essentially invisible flame. For example, at launch facilities for rockets, space vehicles and the like, flame detecting apparatus will automatically trigger fire extinguishing systems when a hydrogen flame is detected to prevent serious explosions from occurring. Thus, when a false alarm is interpreted as a flame, large amounts of extinguishing chemicals may be dumped at great expense.

There is a need for a sensitive flame detector system which can effectively discriminate between background ultraviolet radiation and radiation due to an actual flame.

SUMMARY OF THE INVENTION

The present invention is an improved ultraviolet flame detection system which may be adjusted to be essentially immune to false alarms. Although any of many types of gas discharge tubes which are sensitive to UV radiation may be used, it is preferred to use a type R259 known as a Uvtron. It is also preferred to apply the maximum rated high voltage to the tube to ensure sensitivity. When an ultraviolet energy pulse is incident on the tube, it will fire and a shaped pulse will be generated and applied to the system. The system utilizes a window technique in which a clock generates a sequence of clocking pulses in which the interval between such clocking pulses represents a window. A counter is incorporated in the system which is advanced by pulses from the clock. The counter will monitor pulses from the UV detector circuit to determine if at least one pulse is received by the counter during a window. If a pulse is not received, the counter is reset and will start its count over. If a pulse is received during a window, the counter will continue to count until a preselected number of counts is detected. Logic circuits associated with the system operate in conjunction with the counter to require that a pulse from the UV detector occur at least once in each of a selected number of counts. For example in some applications, six windows having a width between 30 and 660 milliseconds have been used. At least one pulse in each of six frames has been found to be a reliable indication of an actual flame. If the counter fails to see a pulse during a window before reaching the required count, the logic circuits will reset the counter and a new sequence of counts will begin.

As an additional insurance against false alarms and to provide automatic reset of the system, the logic circuits in the system, upon recognition of the required number of counts, will reverse the counter operation such that the counter will then count resets for the selected number of windows to note if there is an absence of pulses from the UV detector. If the required number of windows occurs without receiving a pulse from the UV detector as indicated by failure of the counter to reset, the alarm function will be inhibited. Thus, if the received UV photons were actually a burst of background radiation of some type and not an actual flame, then the occurrence of the desired number, for example six, of resets in sequence would indicate a false alarm and would inhibit the alarm action. On the other hand, if counts do occur within the six count period, the alarm is maintained.

It is therefore a principal object of the invention to provide an ultraviolet type flame detection system having high sensitivity yet which is essentially immune to false alarms.

It is another object of the invention to provide an ultraviolet type flame detection system utilizing a UV discharge detector in which counts of pulses from the detector portion are monitored by a logic circuit to discriminate against pulses due to background radiation.

It is still another object of the invention to provide an ultraviolet type flame detection system which will produce an alarm after a preselected number of UV photons in a sequence of windows is detected and which will automatically reset the alarm after the absence of such number of UV photons in the sequence of windows.

These and other objects and advantages of the invention will become apparent from the following detailed description when read in conjunction with the drawings.

DETAILED DESCRIPTION OF THE PREFERRED EMBODIMENT

Figure 1:
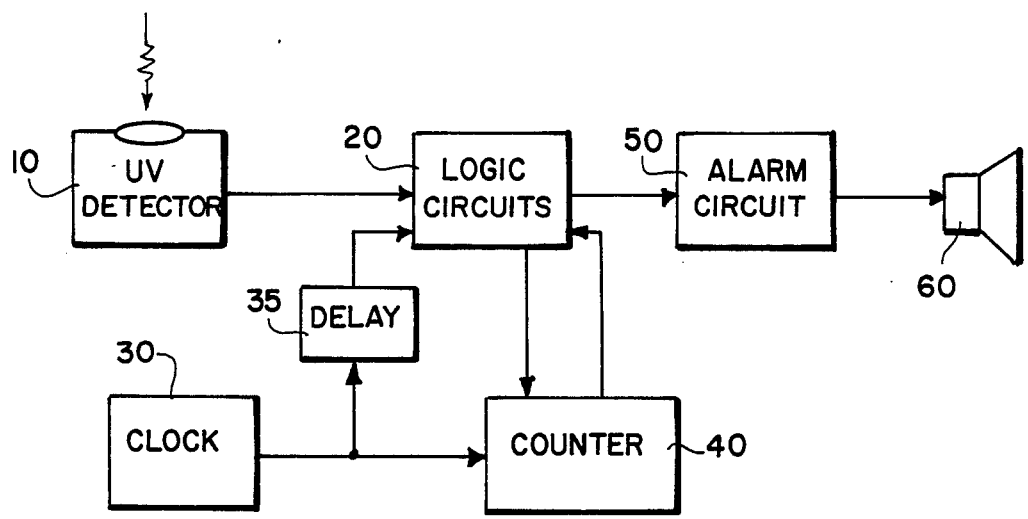
FIG. 1 ia a simplified block diagram of the flame detection system of the invention.
Figure 2:
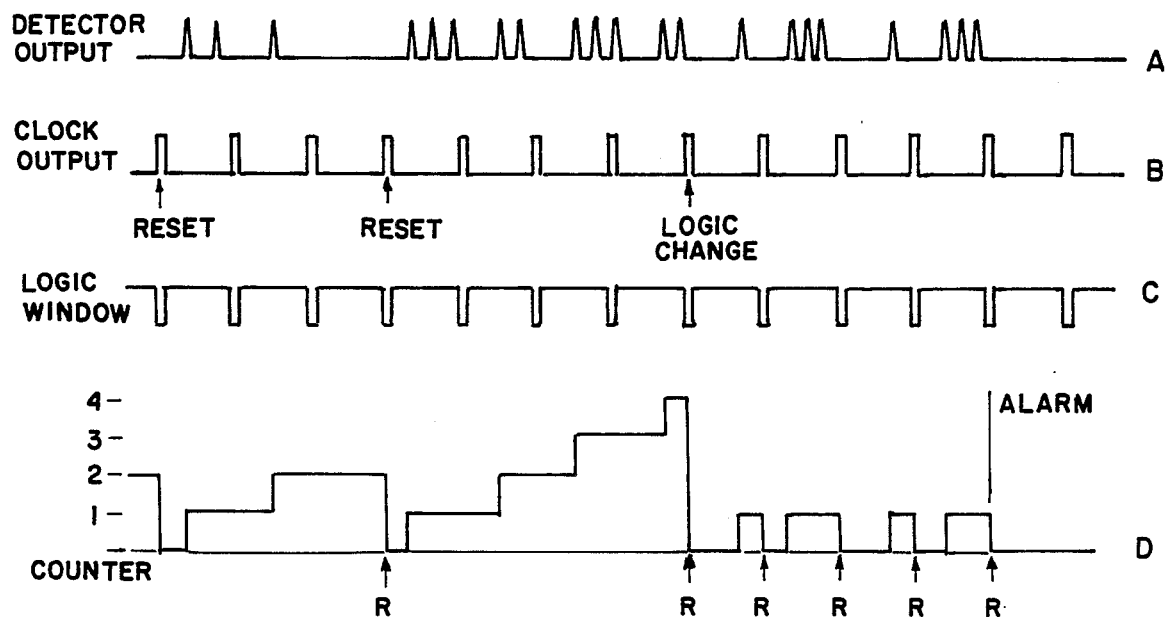
FIG. 2 is a waveform diagram at various points in the system of FIG. 1.

FIG. 1 shows a simplified block diagram of the flame detection system of the invention with FIG. 2 showing various waveforms of the system. A VU detector 10 is provided which is to be disposed adjacent an area in which a flame may be expected to occur. UV photons striking detector 10 will produce a stream of output pulses as indicated on line A of FIG. 2.

A clock 30 produces a sequence of short pulses, as shown on line B, spaced a distance in time $\tau$ which may be selected as desired with a time in the range of 30 milliseconds to 660 milliseconds being satisfactory. The pulses as shown on line B from clock 30 are connected to a binary counter 40. Logic circuits 20 also receive the clock pulses from clock 30 via a delay circuit 35 to effectively produce the window sequence shown on line C of FIG. 2. As will be noted, the logic window duration is equal to $\tau$, the time between clock pulses.

When a pulse from detector 10 occurs during a window, counter 40 will advance one count. Preferably, counter 40 is adjustable such that any selected number of counts may be programmed thereinto. For example in FIG. 2, a count of 4 has been selected. If a detector output pulse occurs in each of four successive windows, counter 40 will reach its 4 count as indicated on line D, enabling gate 45 and causing logic circuits 20 to enable alarm circuit 50 which may include an audible alarm 60.

This procedure is illustrated on line D in FIG. 2 for a first instance in which a pulse from detector 10 occurs in two sequential windows, such pulses being caused by background radiation. The counter will advance 2 counts but no detector output occurs in the third window and logic circuits 20 therefore reset counter 40 as indicated.

It is assumed that a flame causes the next sequence of pulses on line A from detector 10 causing a pulse to appear in each of the next succeeding four windows permitting counter 40 to reach the count of 4. At this point gate 45 is enabled, and alarm circuit 50 is energized. When a flame is thus detected, logic circuits 20 change the logic to require the counter to reset each time a pulse is received from detector 10 in a window as indicated on line D.

After the flame is extinguished, and no photons are detected for four successive windows, logic circuits 20 will then disable the alarm. This procedure provides two functions: that of resetting the detection system when the flame is extinguished; and disabling the alarm in the event that the first sequence of detected pulses was from a background source so as to quickly disable the alarm.

Figure 3:
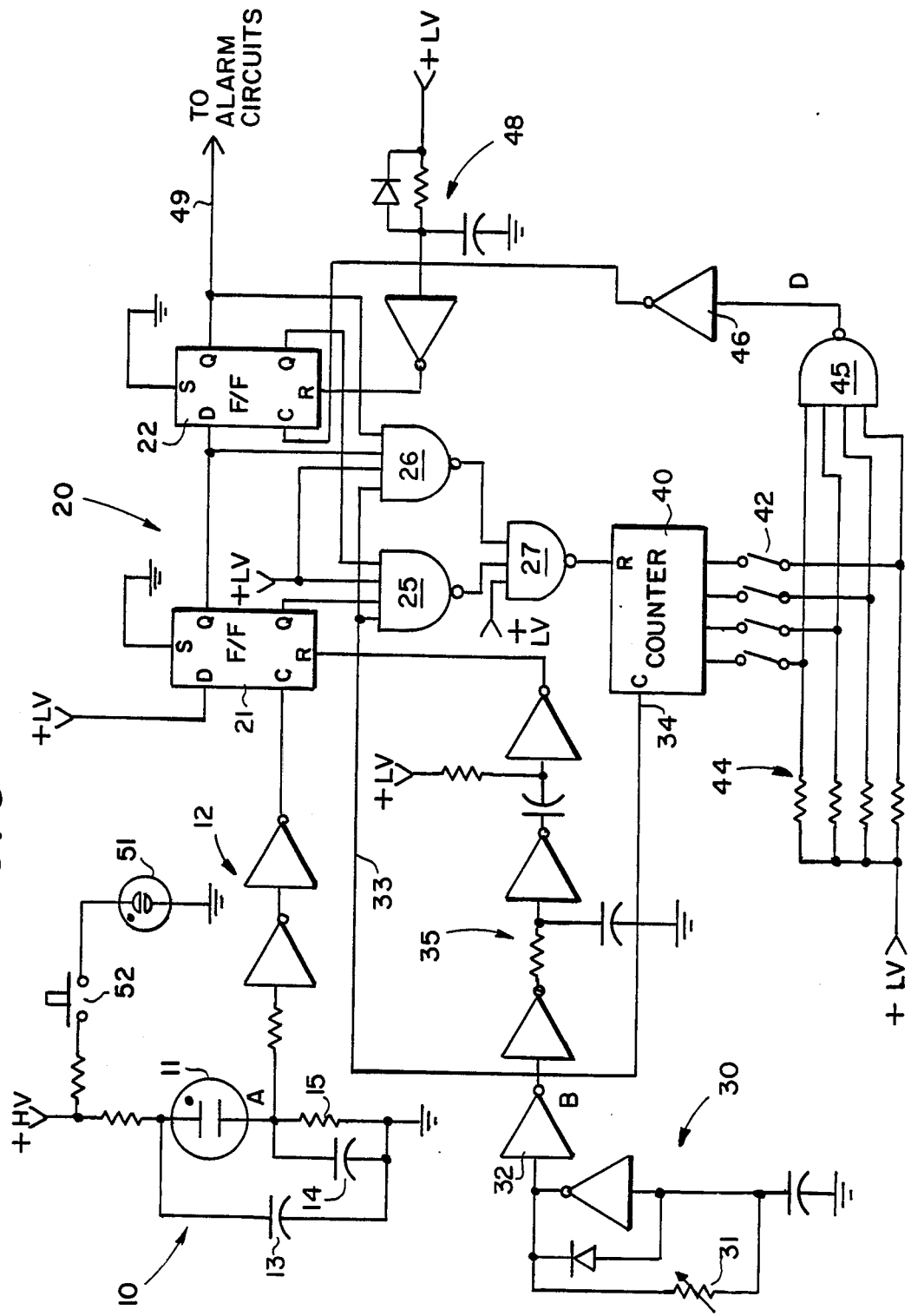
FIG. 3 is a schematic diagram of a preferred embodiment of the invention.

Turning now to FIG. 3, a schematic diagram of a preferred embodiment of the flame detection system is shown. An ultraviolet gas discharge tube 11 is shown, which may be a type R259, is connected via a resistor to a source of positive high voltage which may be on the order of 350 volts. It is desired to operate tube 11 at its highest safe potential for maximum sensitivity. When tube 11 is in the non-fired condition, capacitor 13 will be charged to the supply voltage. An ultraviolet photon incident on tube 11 will cause the gas in tube 11 to ionize causing conduction which will transfer the charge from capacitor 13 to capacitor 14. Discharge of capacitor 13 permits tube 11 to cease conducting. Capacitor 13 will begin to charge through the series resistor in readiness for the next photon. The charge in capacitor 14 then discharges through resistor 15 causing a positive going pulse to appear at A. The pulse is shaped by two Schmitt circuits 12 and applied to flip-flop 21 at its clock input. Schmitt circuit devices are used as shapers and inverters in various elements of the schematic of FIG. 3 and these elements may be a type CD40106.

Flip-flop 21 has its data input connected to a positive low voltage source which permits a pulse from shapers 12 at its clock input to set the Q-output of flip-flop 21 to HIGH level. The period during which Q-output of flip-flop 21 is HIGH is defined as the logic window.

This window is established by clock circuit 30 which includes a potentiometer 31 to permit adjustment of the repetition rate of the circuit. Preferably, control potentiometer 31 is selected to permit adjustment of the spacing between block pulses in the range of 30 milliseconds to 660 milliseconds. The clock output at B is connected to the clock input of binary counter 40. Thus, each occurrance of a clock pulse at point B will cause counter 40 to advance one count.

The window is established by clock circuit 30 which advances binary counter 40 via lead 34 and enables the reset input of counter 40 via lead 33 through NAND gates 25 and 27. When the Q-output of flip-flop 21 is HIGH, gate 25 is disabled and no reset will occur. When Q-output of flip-flop 21 is LOW and Q of flip-flop 22 is HIGH, the clock pulse will reset counter 40. As will now be understood, a detected UV pulse during a window interval will set the Q-output HIGH, inhibiting coutner 40 from resetting. However, if no UV pulse occurs during a window interval, flip-flop 21 is reset by a clock pulse via shaping and delay circuit 35 causing Q-bar of flip-flop 21 to be HIGH. The next clock pulse will then reset counter 40 via gates 25 and 27.

Thus, if at least one UV photon is detected at any time during a window, counter 40 will advance one count. It may be noted that the system ignores additional photons occurring during such a window. If no UV photon is detected during a window, the counter 40 will be reset to its beginning count.

Counter 40, which may be a type CD 40193, includes a set of switches 42 such that any count from 1 to 16 may be programmed. Additional counts may be added if desired. The selected count level selected will depend upon the statistics of the type of flame to be detected and the desired probability of false alarms permissible. Additionally, the selection of the window duration by clock control 31 will influence the false alarm probability. In a hydrogen flame detection system, a window interval of 500 ms and a count of six has proven to provide a vanishingly small false alarm probability.

IF a UV photon is detected in a first window and detection continues such that the counter 40 continues to count, the count programmed by switches 42 will be reached. NAND gate 45 will, via Schmitt inverter 46, clock flip-flop 22 causing the output thereof to be set to HIGH. Lead 49 is connected to an alarm system, not shown, which may provide audible and visual alarms, and energize fire extinguishing apparatus. The Q-bar output of flip-flop 22 is then LOW inhibiting gate 25 while the HIGH Q output enables gate 26.

A pulse from detection of a UV photon in the next window will produce a HIGH on the Q output of flip-flop 21, and the next clock pulse will reset counter 40 via gates 26 and 27. If no UV photon is detected in a window, the Q output of flip-flop 21 remains low, counter 40 does not reset and a clock pulse will advance the counter 40. When no UV photons are detected for the number of windows selected by switches 42, flip-flop 22 will have its Q output set to LOW, disabling the alarm. Thus, the flame detection system of the invention is self-setting.

Circuit 48 is a power-up reset circuit which prevents triggering of an alarm during turn on of power. An ultraviolet 51, which may be an argon-nitrogen lamp such as an AR-7, a neon-tritium lamp such as an M402501-23 or the like may be mounted adjacent tube 11 so as to produce UV photons incident on tube 11. Thus, push button 52 may be used to energize source 51 for testing of the system.

Although a specific circuit has been disclosed, it is to be understood that the disclosure is for exemplary purposes only and many changes may be made therein without departing from the spirit and scope of the invention.

I claim:

1. A flame detection device comprising:
   a detector for producing electrical first pulses from photons of ultraviolet radiation;
   logic circuit means for producing a sequence of logic pulses, said logic pulses defining sequential detection windows having a length greater than the length of said first pulses;
   counting means connected to said logic circuit means and said detector for producing a count for each of said windows in which at least on of said first pulse occurs, said counting means producing an alarm output signal only when said first pulses occur sequentially in a preselected number of sequential windows; and
   reset means for resetting said counting means when no first pulse occurs in one of said windows.

2. A flame detection system comprising:
   (a) a detector for producing short electrical pulses responsive to photons of electromagnetic radiation emanating from a flame;
   (b) first logic circuit means connected to said detector for
      (i) generating a sequence of long electrical pulses defining a sequence of logic windows, and
      (ii) detecting the presence of said short electrical pulses occurring within periods of said logic windows;
   (c) counting circuit means for
      (i) producing a count at the beginning of each of said logic windows,
      (ii) resetting said count if at least one short electrical pulse is not detected within a period of said logic window, and
      (iii) producing an alarm signal when a preselected sequential count is reached; and
   (d) second logic circuit means connected to said counting circuit means and said first logic circuit means for
      (i) causing said counting circuit means to reset upon occurrence of said alarm signal and to reset for each of said logic windows following said alarm signal in which at least one short electrical pulse occurs,
      (ii) advancing said counting circuit means if a short electrical pulse does not occur within a logic window, and
      (iii) terminating said alarm signal when said preselected count is reached.

3. The system as recited in claim 2 in which said detector includes:
   an ultraviolet sensitive gas discharge tube; and
   means for generating said short pulses responsive to a photon of ultraviolet energy incident on said tube.

4. The system as recited in claim 2 in which said first logic circuit means includes:
   a clock circuit for generating a sequence of clocking pulses and in which the period between successive clocking pulses defines said window, said clock circuit connected to said counter means for advancing said counter means one count for each of said clocking pulses;
   a first flip-flop having its clock input connected to said detector for setting said first flip-flop to a first state in response to said short pulses, said clock circuit connected to its reset input for resetting said flip-flop to a second state; and
   a first gate circuit connected to said clock circuit and said first flip-flop for gating a reset pulse to said counter, said first gate circuit being inhibited when said first flip-flop is in its first state.

5. The system as recited in claim 4 in which said second logic circuit means includes:
   a second flip-flop having its clock input connected to said counter means for setting said second flip-flop to a first state when said preselected count is reached, said second flip-flop in its first state producing an alarm signal; and
   a second gate circuit connected to said clock circuit, said first and second flip-flops, and said counting circuit means for gating a reset pulse from said clock circuit to said counting circuit, said second gate circuit gating a reset pulse to said counting circuit only when said second flip-flop is in its first state.

6. The system as recited in claim 2 in which said counting circuit means includes:
   a binary counter; and
   switching means for selecting a value of said preselected sequential count.

7. The system as recited in claim 5 which further comprises a power-up reset circuit for resetting said second flip-flops when power is applied to said system.

8. The system as recited in claim 2 which further comprises a source of ultraviolet radiation disposed adjacent said detector for testing said system.

9. The system as recited in claim 2 in which the duration of said window is in the range of about 30 milliseconds to 660 milliseconds.

10. A flame detection system responsive to electromagnetic radiations from a flame to be detected comprising:
    (a) detector means for detecting photons of electromagnetic radiations from a flame and for producing output signals when such photons are detected;
    (b) window generating means for producing sequence of equal time period windows;
    (c) counting means connected to said detector means and to said window generating means for advancing one count when at least one output signal occurs during a window and resetting when no output signal occurs during a window; and
    (d) logic means connected to said counting means and to said detector means for producing an alarm control signal when said counting means reaches a preselected count.

11. The system as recited in claim 10 in which said logic means, after production of such alarm control signal, causes said counting means to advance one count for each window in which no output signal occurs and to reset for each window in which an output signal occurs, said logic means inhibiting such alarm control signal when said counting means reaches the preselected count.

* * * * *